(12) United States Patent
Liardet et al.

(10) Patent No.: US 8,588,407 B2
(45) Date of Patent: Nov. 19, 2013

(54) PROTECTION OF A CALCULATION PERFORMED BY AN INTEGRATED CIRCUIT

(75) Inventors: Pierre-Yvan Liardet, Peynier (FR); Yannick Teglia, Marseilles (FR); Alain Pomet, Rousset (FR)

(73) Assignee: STMicroelectronics S.A., Montrouge (FR)

( * ) Notice: Subject to any disclaimer, the term of this patent is extended or adjusted under 35 U.S.C. 154(b) by 1336 days.

(21) Appl. No.: 11/640,119

(22) Filed: Dec. 15, 2006
(Under 37 CFR 1.47)

(65) Prior Publication Data
US 2007/0162534 A1 Jul. 12, 2007

Related U.S. Application Data

(63) Continuation of application No. 11/406,816, filed on Apr. 18, 2006, now abandoned.

(30) Foreign Application Priority Data

Apr. 22, 2005 (FR) ...................................... 05 51040

(51) Int. Cl.
*G06F 21/00* (2013.01)
(52) U.S. Cl.
USPC .......................................................... 380/28

(58) Field of Classification Search
USPC ...................................................... 380/28–30
See application file for complete search history.

(56) References Cited

U.S. PATENT DOCUMENTS

2004/0125950 A1   7/2004   Yen et al.

OTHER PUBLICATIONS

French Search Report from corresponding French Application No. 0551040, filed Apr. 22, 2005.
Joye M. et al., *The Montgomery Powering Ladder*, Cryptographic Hardware and Embedded Systems—Ches 2002, 4th International Workshop Revised Papers (Lecture Notes in Computer Science vol. 2523) Springer-Verlag, Berlin Germany, 2002, pp. 291-302, XP02352874.

*Primary Examiner* — Hosuk Song
*Assistant Examiner* — John B King
(74) *Attorney, Agent, or Firm* — Wolf, Greenfield & Sacks, P.C.

(57) ABSTRACT

A method and a circuit for protecting a digital quantity over a first number of bits, in an algorithm executing at least one modular exponentiation of data by the quantity, the steps including at least one squaring up and at least one multiplication and implementing, for each bit of the quantity, different calculation steps according to the state of the bit, a same number of multiplications being performed whatever the state of the bit and all the calculation steps using a multiplication being taken into account to calculate a final result.

8 Claims, 3 Drawing Sheets

PROTECTION OF A CALCULATION PERFORMED BY AN INTEGRATED CIRCUIT

CROSS REFERENCE TO RELATED APPLICATIONS

This application is a continuation of U.S. application Ser. No. 11/406,816, filed Apr. 18, 2006 now abandoned entitled PROTECTION OF A CALCULATION PERFORMED BY AN INTEGRATED CIRCUIT, which application is incorporated herein by reference in its entirety.

BACKGROUND OF THE INVENTION

1. Field of the Invention

The present invention generally relates to electronic circuits and, more specifically, to the protection of data contained in an integrated circuit against an extraction thereof, after fault injections into the electronic circuit operation. The present invention more specifically relates to the protection of modular exponentiation algorithms. Such algorithms are used, for example, in smart cards or secure components for ciphering or signing data by means of a secret quantity internal to the chip.

2. Discussion of the Related Art

FIG. 1 very schematically shows in the form of blocks an example of a simplified architecture of an integrated circuit 1, for example, of a smart card, of the type to which the present invention applies. Circuit 1 comprises a central processing unit 11 (CPU) associated with one or several memories 12 (MEM) among which generally at least one element of non-volatile storage of a secret quantity (for example, a confidential code), and an input/output circuit 13 (I/O) enabling data exchange with the outside of circuit 1. The different elements communicate over one or several data, address, and control buses 14. Most often, several memories 12 among which at least one RAM and one non-volatile memory are provided in the circuit.

Among the possible attacks performed by persons attempting to fraudulently obtain confidential data from chip 1, the present invention applies to so-called differential fault analysis attacks (DFA) which comprises the analysis of the result of a disturbance of the operation of component 1, for example, by means of radiation (laser, infrared, X-rays, etc.) or by other means (for example, by acting on the component supply).

Some integrated circuits comprise software tools for detecting such disturbances by checking whether a program has correctly executed. For example, the same instructions are executed twice and it is checked that they lead to the same result, or a signature calculation is performed on data extracted from the memory. In case of a fraud attempt detection, the component is generally blocked, that is, it does not provide the required result.

The data provided (output) by the component on its input/output pads are exploited by the hacker, either by their simple existence indicating the absence of a blocking, or by their content, to discover secret elements of the chip (algorithm, secret key, etc.).

In many algorithms handling digital data of which it is considered that they must not be readily extracted from circuit 1, one or several modular exponentiation operations are performed, which use multiplication operators. Such is the case, for example, for so-called DSA, RSA, and Diffie-Hellman algorithms.

FIG. 2 shows, in the form of a simplified timing diagram, a conventional example of a modular exponentiation calculation, modulo a number P over n bits, comprising, based on a message over several bits M and on a secret quantity or key d over at most n bits, the calculating of the following result:

$Z_0 = M^d \mod P$ (block 20).

To perform this calculation, it is necessary to pass through intermediary results calculated by successive multiplications. It is spoken of a square-multiply method. Such intermediary results are contained in one or several registers.

For example, a quantity $Z_n$ contained in a first register noted Z as being equal to unity (block 21, $Z_n=1$) is initialized. Register Z will contain, at the end of an algorithm, final result $Z_0$. A counter i is then initialized as being equal to n−1 (block 22). The index of counter i corresponds to the successive ranks of the n bits of secret quantity d, which may be written as:

$$d = \sum_{i=0}^{n-1} d_i 2^i.$$

The initialization of index counter i amounts to executing a loop calculation down to i=0 (block 23), at each iteration of which successive multiplications will be performed according to the state of current bit $d_i$ of quantity d.

In a first step (block 24) of this loop, an intermediary result $R_i$ is calculated by squaring up (multiplication by itself), modulo P, the content of result register Z. Intermediary result $R_i=(Z_{i+1})^2 \mod P$ is, in practice, stored in a register noted R.

Then (block 25), the result of this calculation is multiplied, modulo P, by message M. The result $S_i=R_i*M \mod P$ of this second multiplication is stored in another register noted S.

A test (block 26, $d_i=1$?) of the state of the current bit of quantity d (the exponent of the exponentiation) is then performed. If this state is 0 (output N of block 26), the content of register Z takes value $R_i$ (block 27). If bit $d_i$ is at state 1, register Z takes value $S_i$ (block 27'). This amounts not to taking into account the calculation step of block 25 in the case where the current bit of the key is state 0.

As long as the loop has not ended (output N of block 23), counter i is decremented (block 28, i=i−1) and it is returned to the input of block 24.

At the end of the loop (output Y of block 23), register Z contains quantity $Z_0$.

In fact, quantity $S_i$ is calculated even if it is not used for the key bits at state 0, to mask the algorithm execution against possible attacks by power analysis (SPA) of the integrated circuit by using the multiplier twice per loop, whatever the state of the current bit of secret quantity d.

A disadvantage however is that this makes the algorithm execution more sensitive to fault injection attacks. Indeed, if the execution of the calculation is disturbed after the step of block 24 while the current bit of quantity d is equal to 0, this disturbance does not modify the intermediary result $Z_i$ that must be output since the operation performed by the multiplier (block 25) is not exploited. However, if the disturbance occurs while the current bit of quantity d is at state 1, this will modify this intermediary result.

When the mechanism of protection against fault injections calculates the signature of the intermediary result, or executes the calculation a second time, it only detects a fraud attempt if the disturbance has occurred on an iteration of index i at state 1. Accordingly, this mechanism will provide final result $Z_0$ of the calculation if the disturbance has occurred during the processing corresponding to a bit of the secret quantity at state 0. A repeating of the disturbance at different times (in different iterations) on successive executions enables the hacker to determine secret quantity d by merely observing whether the component provides a result (bit at state 0) or not (bit at state 1).

SUMMARY OF THE INVENTION

The present invention aims at overcoming all or part of the disadvantages of integrated circuits handling quantities considered as confidential against possible frauds by fault injection into the operation of a circuit executing a modular exponentiation.

The present invention more specifically aims at providing a solution which is compatible with conventional mechanisms which prevent the outputting of a result when a possible disturbance is detected.

The present invention also aims at providing a solution which remains compatible with the objects of protection against possible analyses of the circuit power consumption.

To achieve all or part of these objects, as well as others, the present invention provides a method for protecting a digital quantity over a first number of bits, in an algorithm executing at least one modular exponentiation of data by said quantity, said steps comprising at least one squaring up and at least one multiplication and implementing, for each bit of said quantity, different calculation steps according to the state of said bit, comprising the performing of a same number of multiplications whatever the state of said bit and the taking into account of all the calculation steps using a multiplication to calculate a final result.

According to an embodiment of the present invention, said steps comprise a test on the state of the current bit of said quantity to condition the operands of at least one multiplication step.

According to an embodiment of the present invention, the algorithm is an algorithm selected from among the DSA, RSA, and Diffie-Hellman algorithms.

According to an embodiment of the present invention, for a number n of bits of said quantity, a first register for storing the result is initialized with the unity value and said steps of each of n iterations are:

$R_i = (S_{i+1})^2 \mod P$; then $S_i = R_i * M \mod P$ if the current bit is equal to 0, or $S_i = R_i * (kP+1) \mod P$ otherwise, where $S_i$ designates the value contained in the first register during the loop of rank i, $R_i$ designates the value contained in a second register during the loop of rank i, P designates the modulo over n bits, and k designates a non-zero relative integer.

According to an embodiment of the present invention, for a number n of bits of said quantity, a first register for storing the result is initialized with the unity value and said steps of each of n iterations are:

$R_i = A^{-1} * (S_{i+1})^2 \mod P$; then $S_i = R_i * (A*M) \mod P$ if the current bit is equal to 0, or $S_i = R_i * A \mod P$ otherwise, where $S_i$ designates the value contained in the first register during the loop of rank i, $R_i$ designates the value contained in a second register during the iteration of rank i, P designates the modulo over n bits, and A designates a number invertible modulo P.

According to an embodiment of the present invention, for a number n of bits of said quantity, a first register for storing the result is initialized with the unity value and said steps of each of n iterations are:

$R_i = (R_{i+1} + S_{i+1}) * R_{i+1} \mod P$; then $S_i = (R_{i+1} + S_{i+1}) * S_{i+1} \mod P$ if the current bit is equal to 0, or $R_i = (R_{i+1} + S_{i+1}) * (R_{i+1} + S_{i+1}) \mod P$, then $S_i = R_i * (M-1) \mod P$ otherwise, where $S_i$ designates the value contained in the first register during the iteration of rank i, $R_i$ designates the value contained in a second register during the iteration of rank i, and P designates the modulo over n bits.

According to an embodiment of the present invention, for a number n of bits of said quantity, a first register for storing the result is initialized with the unity value and said steps of each of n iterations are:

$R_i = R_{i+1} * A^{-1} \mod P$ then $S_i = (R_i)^2 * A \mod P$ if the current bit is equal to 0, or $R_i = (R_{i+1} * A^{-1})^2 \mod P$ then $S_i = R_i * (M*A) \mod P$ otherwise, where $S_i$ designates the value contained in the first register during the loop of rank i, $R_i$ designates the value contained in a second register during the loop of rank i, P designates the modulo over n bits, and A designates a number invertible modulo P.

The present invention also provides an integrated circuit comprising at least a central processing unit, a memory, and an input/output circuit, comprising means for preventing the provision of data to the outside of the circuit in case of a fault detection in the execution of an algorithm.

The foregoing and other objects, features, and advantages of the present invention will be discussed in detail in the following non-limiting description of specific embodiments in connection with the accompanying drawings.

DETAILED DESCRIPTION

Figure 1:
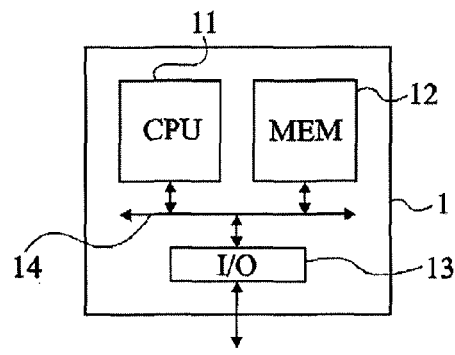
FIG. 1, previously described, very schematically and partially shows in the form of blocks an example of an integrated circuit of the type to which the present invention applies.
Figure 2:
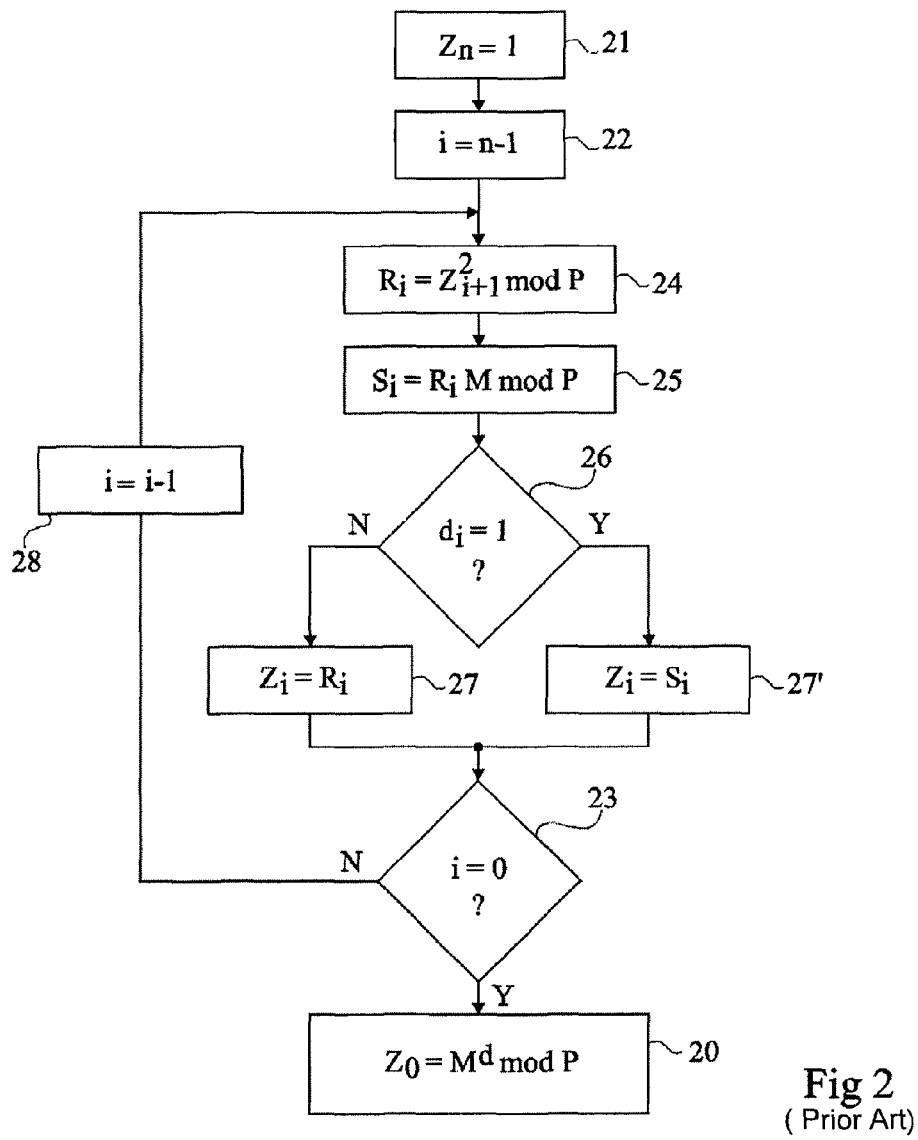
FIG. 2 is a timing diagram showing conventional steps of calculation of a modular exponentiation.

The same elements have been designated with the same reference numerals in the different drawings. For clarity, only those method steps and circuit elements which are useful to the understanding of the present invention have been shown in the drawings and will be described hereafter. In particular the details constitutive of the central processing unit and especially the operators of multiplicator type used to calculate a modular exponentiation have not been discussed, the present invention being compatible with any conventional microprocessor exploiting stored data. Further, what exploitation is made upstream or downstream of the modular exponentiation algorithm processed by the present invention, of the message and/or of the secret quantities has not been described in detail, the present invention being here again compatible with any conventional algorithm, provided that said algorithm involves a modular exponentiation by means of a multiplier.

According to the discussed embodiment of the present invention, the multiplier remains used a same number of times (at least twice per loop) whatever the state of the current bit of the secret quantity and, further all the results of these multiplications condition the intermediary results, and thus the final result. Accordingly, in case of a fault injection, the protection mechanisms will detect a different final result between two executions or the absence of a correct signature of the final result, whether the disturbance occurs in a loop of a current exponent bit at state 1 or at state 0. The provision or not of a result does not directly provide information about the bit of the digital quantity having been used as an exponent.

Figure 3:
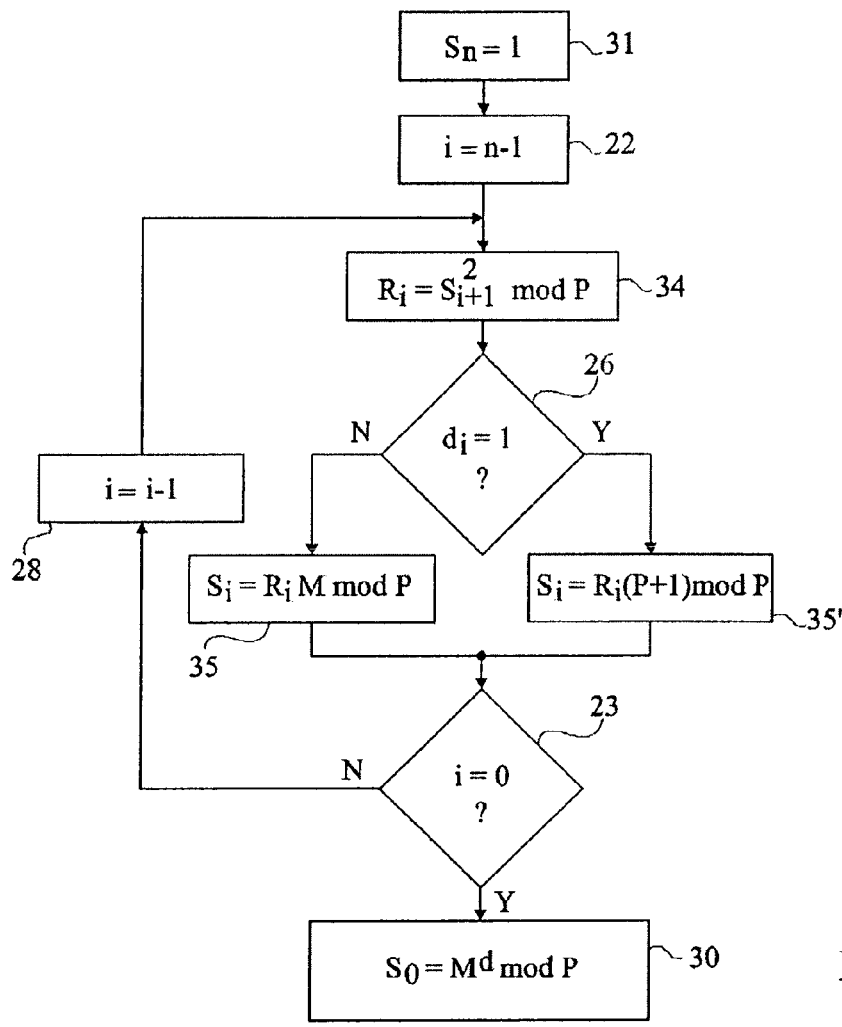
FIG. 3 shows, in the form of a flowchart, a first embodiment of the modular exponentiation calculation method according to the present invention.

FIG. 3 schematically shows in the form of a flowchart an embodiment of a modular exponentiation calculation algorithm according to the present invention.

Figure 4:
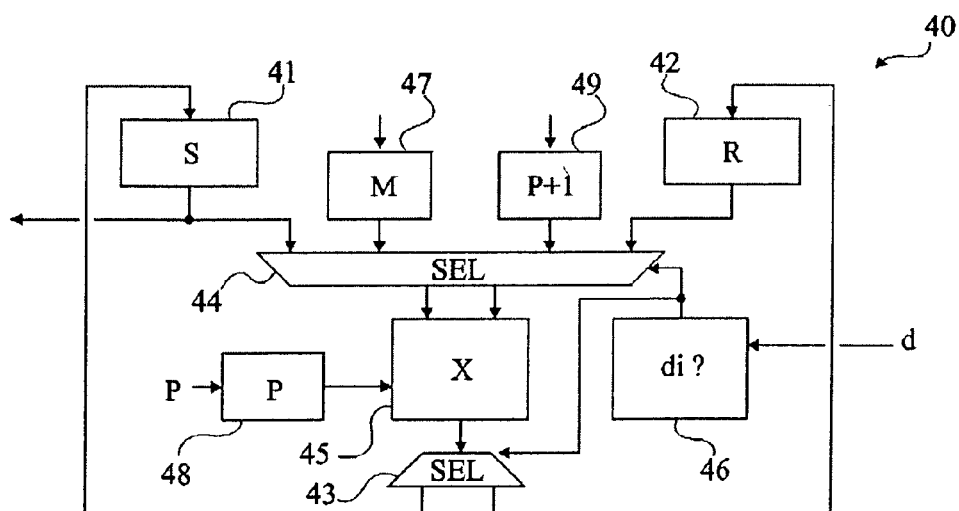
FIG. 4 is a simplified functional block diagram of elements of the integrated circuit involved in the method of FIG. 3.

FIG. 4 schematically shows in the form of blocks an example of elements (registers, operator, etc.) usable according to an embodiment of the method of FIG. 3.

It is started (block 31, FIG. 3) by initializing a register 41 containing quantity S at 1 ($S_n=1$). Then, a counter of index i is initialized (block 22) at value n−1 to initialize a loop calculation down to value i=0 (block 23).

Within the loop, it is started by calculating a result $R_i$ as being equal to the square of the content of register 41 modulo P (block 34, $R_i=(S_{i+1})^2$ mod P). Result R is stored in a register 42 (FIG. 4).

According to the state of current bit $d_i$ of quantity d (block 26), one calculation or another is executed, both calculations modifying register S and using the multiplier. In case of a bit at state 0 (output N of block 26), intermediary result $R_i$ is multiplied by M, modulo P (block 35, $S_i=R_i*M$ mod P). In the case where the bit is at state 1, intermediary result $R_i$ is multiplied by P+1, modulo P (block 35', $S_i=R_i*(P+1)$ mod P).

As long as index i is not zero, it is decremented (block 28, i=i−1) and it is returned to step 34.

At the end of the loop (output Y of block 23), register 41 contains value $S_0=M^d$ mod P.

On the architecture side (FIG. 4), a multiplication operator 45 (X) is loaded by a four-to-two selector 44 (SEL) having its respective inputs receiving values S, M, P+1, and R stored, for example, in registers 41, 47, 49, and 42. Multiplier 45 also receives the P modulo originating, for example, from a register 48, and its output is branched by a selector 43 (SEL) towards register 41 or towards register 42 according to the state of bit $d_i$ of quantity d. Selectors 43 and 44 are controlled by a block 46 receiving quantity d to process it bit by bit.

An advantage of the present invention is that, whatever the time of the possible disturbance of the calculation, the final result provided by said calculation will be disturbed (false) so that the component (for example, the smart card) will refuse to output it. This results from the fact that, each time the multiplier is used (block 34, 35, or 35'), the corresponding result is useful to obtain the final result.

According to a first variation of the first embodiment, the operation of block 35' is replaced with $S_i=R_i*(kP+1)$ mod P, where k is any relative integer.

According to a second variation, data M are replaced with data A*M, where A is an invertible value modulo P, and the operations of steps 34, 35, and 35' are respectively replaced with operations $R_i=A^{-1}*(S_{i+1})^2$ mod P, $S_1=R_i*(A*M)$ mod P and $S_i=R_i*A$ mod P. Preferably, this variation uses at least one additional register initialized with value A*M, modulo P. This enables maintaining identical the number of multiplications whatever the value of secret quantity d, and thus protecting the calculation against possible attacks by power analysis. To limit the number of operations, another additional register is initialized with value $A^{-1}$, modulo P. In practice, value A is also stored in an additional register.

Figure 5:
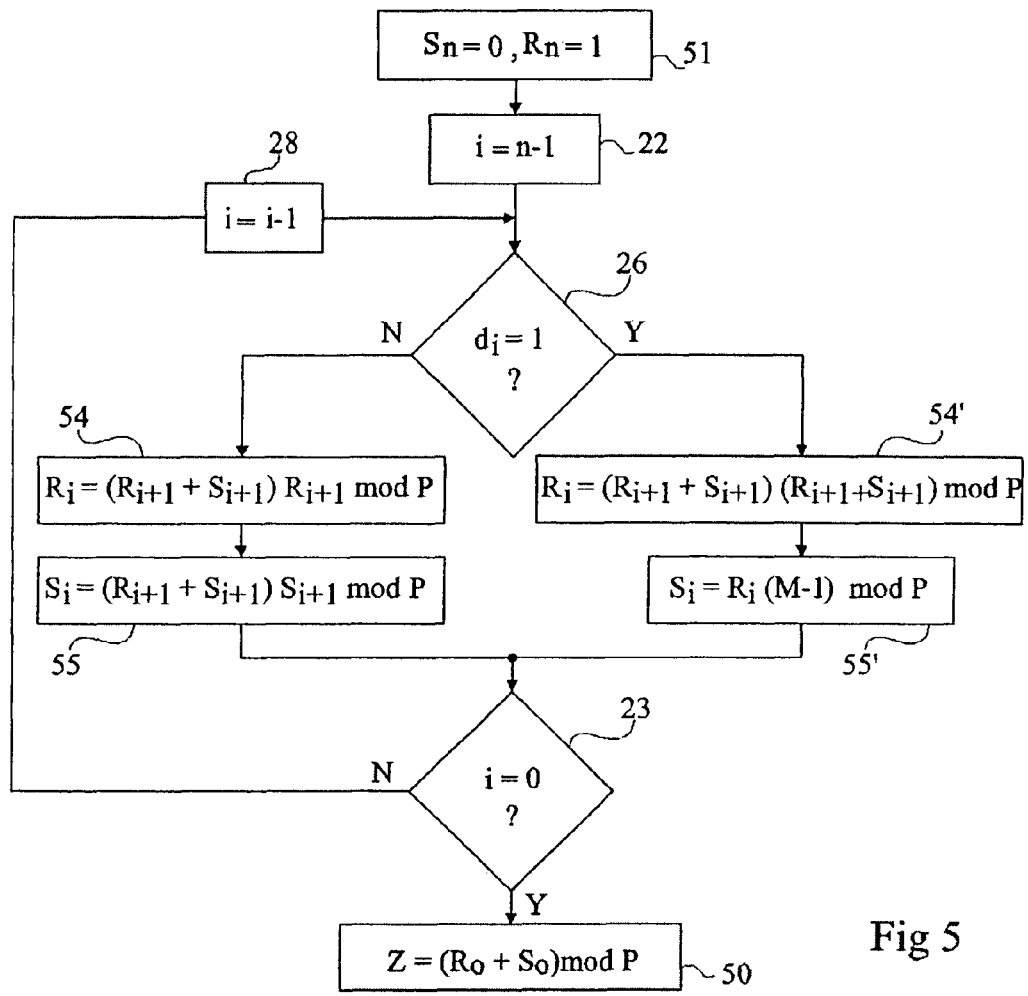
FIG. 5 shows, in the form of a flowchart, a second embodiment of a modular exponentiation calculation method according to the present invention.

FIG. 5 shows, in the form of a flowchart, a second embodiment of the method of the present invention.

Figure 6:
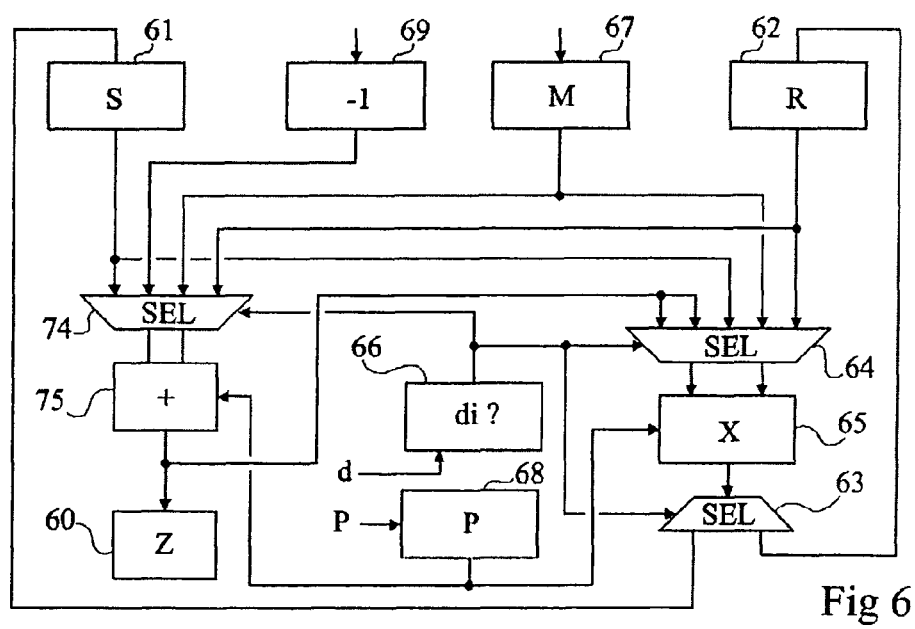
FIG. 6 is a simplified functional block diagram of elements of the integrated circuit involved in the method of FIG. 5.

FIG. 6 schematically shows in the form of blocks an example of elements (registers, operators, etc.) usable according to an embodiment of the method of FIG. 5.

According to this embodiment, result Z corresponds to the sum modulo P of respective results $R_0$ and $S_0$.

Values $R_n$ and $S_n$ of the two registers 62 (R) and 61 (S) are respectively initialized at 1 and at 0 (block 51) or conversely (0 and 1, respectively). Then, counter i is initialized (block 22) to value n−1.

The first step within the loop is the test on the value of bit $d_i$ (block 26).

If bit $d_i$ is at state 1, two successive calculation steps are performed. The first step (block 54', $R_i=(R_{i+1}+S_{i+1})*(R_{i+1}+S_{i+1})$ mod P) amounts to calculating the square of value $Z_{i+1}$ mod P and of placing it in register 62. In the is second step (block 55', $S_i=R_i*(M-1)$ mod P), content R of register 62 obtained at the preceding step is multiplied, modulo P, by value M−1. The result of this multiplication is stored in register 61.

If bit $d_i$ is at state 0, a first step (block 54, $R_i=(R_{i+1}+S_{i+1})*R_{i+1}$ mod P) performs the sum of values $R_{i+1}$ and $S_{i+1}$ contained in registers 61 and 63, then multiplies this sum by value $R_{i+1}$. The intermediary result is stored in register 62. A second step (block 55, $S_i=(R_{i+1}+S_{i+1})*S_{i+1}$ mod P) performs a similar operation on register 61 by multiplying, by value $S_{i+1}$, the sum of values $R_{i+1}$ and $S_{i+1}$. All these operations are performed modulo P.

At the end of a loop (block 50), the contents of registers 61 and 62 are summed up and the expected value $Z=R_0+S_0$ mod P, that is, $M_0$ is obtained.

An advantage of this embodiment is that it enables inverting the respective functions of quantities R and S, and thus improving the resistance to power analysis attacks.

On the architecture side (FIG. 6), a multiplication operation 65 (X) is loaded by a five-to-two selector 64 (SEL) having its respective inputs receiving twice the result of an adder 75 (+), value S (register 61), value M (register 67), and value R (register 62). Multiplier 65 also receives the P modulo originating, for example, from a register 68 and its output is branched by a selector 63 (SEL) towards register 61 or towards register 62 according to the state of bit $d_i$ of quantity d. The adder is loaded by a four-to-two selector 74 (SEL) having its respective inputs receiving values S, −1, M, and R from registers 61, 69, 67, and 62. Adder 75 also receives the P modulo of register 68 and its output is sent onto two inputs of selector 64 and onto an input of an output register 60 (value Z). Selectors 63, 64, and 74 are controlled by a block 66 receiving quantity d to process it bit by bit.

According to a first variation, values $R_n$ and $S_n$ are initialized at values such that $R_n+S_n=1$ mod P.

According to a second variation, an additional value A, invertible modulo P, is used and steps 54, 54', 55, and 55' respectively execute the following calculations: $R_i=(R_{i+1}*A^{-1})^2$ mod P, $S_i=R_i*(M*A)$ mod P, $R_i=R_{i+1}*A^{-1}$ mod P, and $S_i=(R_i)^2*A$ mod P. The final result is obtained by calculating $Z_0=S_0*A$ mod P. Preferably, this variation uses at least two additional registers respectively initialized with values $A^{-1}$, modulo P, and M*A, modulo P. This enables respecting a same number of multiplications in each loop, thus protecting the calculation against possible power analysis attacks. In practice, value A is itself contained in an additional register.

An advantage of the present invention, whatever its implementation mode, is that it makes the algorithm resistant against fault injection attacks while respecting its resistance against attacks by power analysis.

Of course, the present invention is likely to have various alterations, improvements, and modifications which will readily occur to those skilled in the art. In particular, although the present invention has been described hereabove in relation with an example more specifically intended for RSA-type algorithms, it more generally applies as soon as an algorithm implementing a secret quantity uses this quantity as the exponent of a square-multiply-type calculation. Further, the implementation of the present invention based on the functional indications given hereabove is within the abilities of those skilled in the art, using tools known per se. Similarly, the selection of a variation depends on the application. For example, if P is a positive prime number, any non-zero positive number smaller than P is invertible modulo P, and can thus be selected as value A.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for protecting a digital quantity over a first number of bits, in an algorithm executing at least one modular exponentiation of data by said quantity, successive iterations of different calculation steps, according to a state of a current bit of said quantity, comprising at least two multiplications, the method comprising performing, for each iteration, a same number of multiplications whatever the state of said current bit, said steps of each iteration comprising a test on the state of only said current bit to condition the operands of at least one of the multiplications, branching to a first multiplication or to a second multiplication according to the state of said current bit, and using intermediate results of all the multiplication steps of each iteration in calculating a final result, wherein for a number n of bits of said quantity, a first register for storing the final result is initialized with the unity value and said steps of each iteration of n iterations are:

$R_i=(S_{i+1})^2 \bmod P$; then $S_i=R_i*M \bmod P$ if the current bit is equal to 0, or $S_i=R_i*(kP+1) \bmod P$ otherwise, where $S_i$ designates the value contained in the first register during iteration i, $R_i$ designates the value contained in a second register during iteration i, M designates the data, P designates the modulo over n bits, and k designates a non-zero relative integer, wherein $S_i$ represents the modular exponentiation of data M after all iterations and wherein the digital quantity is protected against fault injection by performing the same number of multiplications whatever the state of the current bit and by using the intermediate results of all the multiplication steps of each iteration in calculating the final result.

2. The method of claim 1, wherein the algorithm is an algorithm selected from among the DSA, RSA, and Diffie-Hellman algorithms.

3. An integrated circuit comprising at least a central processing unit, a memory, and an input/output circuit, comprising means for preventing the provision of data to the outside of the circuit in case of a fault detection in the execution of an algorithm, using the method of claim 1.

4. A method for protecting a digital quantity over a first number of bits, in an algorithm executing at least one modular exponentiation of data by said quantity, successive iterations of different calculation steps, according to a state of a current bit of said quantity, comprising at least two multiplications, the method comprising performing, for each iteration, a same number of multiplications whatever the state of said current bit, said steps of each iteration comprising a test on the state of only said current bit to condition the operands of at least one of the multiplications, branching to a first multiplication or to a second multiplication according to the state of said current bit, and using intermediate results of all the multiplication steps of each iteration in calculating a final result, wherein for a number n of bits of said quantity, a first register for storing the final result is initialized with the unity value and said steps of each iteration of n iterations are:

$R_i=(R_{i+1}+S_{i+1})*R_{i+1} \bmod P$; then $S_i=(R_{i+1}+S_{i+1})*S_{i+1} \bmod P$ if the current bit is equal to 0, or $R_i=(R_{i+1}+S_{i+1})*(R_{i+1}+S_{i+1}) \bmod P$, then $S_i=R_i*(M-1) \bmod P$ otherwise, where $S_i$ designates the value contained in the first register during iteration i, $R_i$ designates the value contained in a second register during iteration i, M designates the data, and P designates the modulo over n bits, wherein $(S_i-R_i) \bmod P$ represents the modular exponentiation of data M after all iterations and wherein the digital quantity is protected against fault injection by performing the same number of multiplications whatever the state of the current bit and by using the intermediate results of all the multiplication steps of each iteration in calculating the final result.

5. A method for protecting a digital quantity having a number of bits, in an algorithm executing at least one modular exponentiation of data by the digital quantity, the algorithm comprising a plurality of calculations by an integrated circuit, the method comprising:

testing a state of only a current bit of the digital quantity;

branching to a first calculation in response to a first state of the current bit;

branching to a second calculation in response to a second state of the current bit, the first and second calculations each having at least one multiplication;

repeating, in successive iterations, the testing and the branching for each bit of the digital quantity; and calculating a final result using intermediate results of all of the multiplications of each iteration, wherein the digital quantity comprises n bits, and wherein the calculations of each iteration of n iterations corresponding to each of the n bits comprise:

$R_i=(S_{i+1})^2 \bmod P$; then if the current bit is equal to 0, $$S_i = R_i * M \bmod P;$$

otherwise, $$S_i = R_i * (kP+1) \bmod P,$$

where $S_i$ designates a value contained in the first register during iteration i, $R_i$ designates a value contained in a second register during iteration i, P designates the modulo over n bits, k designates a non-zero relative integer, and M designates the data, wherein $S_i$ represents the modular exponentiation of data M after all iterations and wherein the digital quantity is protected against fault injection by performing a same number of multiplications whatever the state of the current bit and by using the intermediate results of all the multiplication steps of each iteration in calculating the final result.

6. The method of claim 5, wherein the algorithm is selected from a group consisting of DSA, RSA, and Diffie-Hellman algorithms.

7. A method for protecting a digital quantity having a number of bits, in an algorithm executing at least one modular exponentiation of data by the digital quantity, the algorithm comprising a plurality of calculations by an integrated circuit, the method comprising:

testing a state of only a current bit of the digital quantity;
branching to a first calculation in response to a first state of the current bit;
branching to a second calculation in response to a second state of the current bit, the first and second calculations each having at least one multiplication;
repeating, in successive iterations, the testing and the branching for each bit of the digital quantity; and
calculating a final result using intermediate results of all of the multiplications of each iteration, wherein the digital quantity comprises n bits, and wherein the calculations of each iteration of n iterations corresponding to each of the n bits comprise:

if the current bit is equal to 0, then $$R_i = (R_{i+1} + S_{i+1}) * R_{i+1} \bmod P; \text{ then}$$

$$S_i = (R_{i+1} + S_{i+1}) * S_{i+1} \bmod P;$$

otherwise, $$R_i = (R_{i+1} + S_{i+1}) * (R_{i+1} + S_{i+1}) \bmod P, \text{ then}$$

$$S_i = R_i * (M-1) \bmod P,$$

where $S_i$ designates a value contained in the first register during iteration i, $R_i$ designates a value contained in a second register during iteration i, P designates the modulo over n bits, and M designates the data, wherein $(S_i - R_i) \bmod P$ represents the modular exponentiation of data M after all iterations and wherein the digital quantity is protected against fault injection by performing a same number of multiplications whatever the state of the current bit and by using the intermediate results of all the multiplication steps of each iteration in calculating the final result.

8. An integrated circuit comprising:
a central processing unit;
a memory; and
the central processing unit including a circuit configured to protect a digital quantity having a number of bits during execution of an algorithm, the algorithm executing at least one modular exponentiation of data by the digital quantity, the circuit configured for:

testing a state of only a current bit of the digital quantity;
branching to a first calculation in response to a first state of the current bit;
branching to a second calculation in response to a second state of the current bit, the first and second calculations each having at least one multiplication;
repeating, in successive iterations, the testing and the branching for each bit of the digital quantity; and
calculating a final result using intermediate results of all of the multiplications of each iteration, wherein the digital quantity comprises n bits, and wherein the calculations of each iteration of n iterations corresponding to each of the n bits comprise:

$$R_i = (S_{i+1})^2 \bmod P; \text{ then}$$

if the current bit is equal to 0, $$S_i = R_i * M \bmod P;$$

otherwise, $$S_i = R_i * (kP+1) \bmod P,$$

where $S_i$ designates a value contained in the first register during iteration i, $R_i$ designates a value contained in a second register during iteration i, P designates the modulo over n bits, k designates a non-zero relative integer, and M designates the data, wherein $S_i$ represents the modular exponentiation of data M after all iterations and wherein the digital quantity is protected against fault injection by performing a same number of multiplications whatever the state of the current bit and by using the intermediate results of all the multiplication steps of each iteration in calculating the final result.

* * * * *